(12) United States Patent
Kaneko et al.

(10) Patent No.: US 7,046,925 B2
(45) Date of Patent: May 16, 2006

(54) SUPERIMPOSE-PLATE FOR VIEW FINDER

(75) Inventors: Hidefumi Kaneko, Tokyo (JP); Tetsuya Abe, Hokkaido (JP); Akihiro Sugiyama, Tochigi (JP); Atsuo Kabeta, Tochigi (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/759,022

(22) Filed: Jan. 20, 2004

(65) Prior Publication Data

US 2004/0156128 A1    Aug. 12, 2004

(30) Foreign Application Priority Data

Jan. 17, 2003  (JP)  ............................. 2003-009594
Jan. 17, 2003  (JP)  ............................. 2003-009663

(51) Int. Cl.
G03B 13/24 (2006.01)
G03B 13/06 (2006.01)

(52) U.S. Cl. ...................... 396/113; 396/152
(58) Field of Classification Search ................ 396/111, 396/113, 147, 148, 150, 152
See application file for complete search history.

(56) References Cited

U.S. PATENT DOCUMENTS

| | | | |
|---|---|---|---|
| 2,986,599 A * | 5/1961 | Kosche et al. ............... 396/148 |
| 3,783,765 A | 1/1974 | Uno et al. | |
| 4,003,637 A * | 1/1977 | Masuoka ..................... 396/150 |
| 4,021,830 A | 5/1977 | Kanno | |
| 4,367,463 A * | 1/1983 | Suzuki et al. ............... 396/147 |
| 4,560,264 A | 12/1985 | Kitazawa et al. | |
| 5,053,803 A * | 10/1991 | Suda et al. .................. 396/111 |
| 5,250,969 A | 10/1993 | Abe et al. | |
| 5,526,083 A | 6/1996 | Misawa | |
| 5,969,869 A | 10/1999 | Hirai et al. | |
| 6,104,884 A | 8/2000 | Abe | |
| 6,292,629 B1 | 9/2001 | Sensui | |
| 6,377,409 B1 | 4/2002 | Kanai | |
| 6,714,244 B1 | 3/2004 | Takebayashi et al. | |
| 2003/0107801 A1 | 6/2003 | Ishii et al. | |

FOREIGN PATENT DOCUMENTS

JP          2002-268128          9/2002

* cited by examiner

*Primary Examiner*—Christopher Mahoney
(74) *Attorney, Agent, or Firm*—Greenblum & Bernstein, P.L.C.

(57) ABSTRACT

A superimpose-plate is put on a focusing glass, on which a subject image obtained through the photographing optical system is formed. The superimpose-plate and the focusing glass are provided in an incident opening of a hollow pentagonal mirror. The superimpose-plate comprises a plurality of micro-prisms that are formed on the superimpose-plate. Each of the micro-prisms shows a triangle in a cross-section. The vertical angle of the triangle is identical in each of the micro-prisms. A ridgeline of each of the micro-prisms is parallel to the right-left direction of the picture plane of the view finder.

21 Claims, 11 Drawing Sheets

SUPERIMPOSE-PLATE FOR VIEW FINDER

BACKGROUND OF THE INVENTION

1. Field of the Invention

The present invention relates to a superimpose-plate for indicating a focused point, for example, in a view finder of a single-lens reflex camera.

2. Description of the Related Art

Conventionally, there is known a single-lens reflex camera provided with a function, in which a plurality of distance-measurement points are set for an image to be photographed, and a point, which is in-focus and included in the distance-measurement points, is indicated and superimposed on a subject image-in a view finder, as disclosed in Japanese Unexamined Patent Publication No. 2002-268128. Namely, a focusing glass and a superimpose-plate are superposed on each other, and disposed under a hollow pentagonal mirror, and if the number of the distance-measurement-points is seven, seven small focusing marks are formed on the superimpose-plate. A light-projecting optical system is provided in a rear portion or an emergent opening of the hollow pentagonal mirror and above an ocular optical system. In a photographing operation, when any point of the distance-measurement points is in-focus, an illumination light beam is radiated from the light-projecting optical system onto the corresponding focusing mark, so that the photographer can recognize the in-focus point.

Each of the focusing marks formed on the superimpose-plate is formed by lots of micro-prisms, which are inclined relative-to a surface of the superimpose-plate at an inclination angle that depends upon the position of the focusing mark. Namely, an illumination light beam is obliquely radiated from a light source, of the light-projecting optical system provided at a side of the emergent opening of the hollow pentagonal mirror. The radiation angle of the illumination light beam differs depending upon the position of the focusing mark, and the micro-prisms are inclined at an angle such that the illumination-light beam is effectively received.

Thus, since the inclination angles of the micro-prisms are different from each other, the manufacturing process of the superimpose-plate is complicated, which in turn makes controlling the manufacturing process difficult, resulting in increased manufacturing cost.

Further, for indicating a focusing mark by using lots of micro-prisms, it is preferable that the micro-prisms are gathered as closely together as possible.

SUMMARY OF THE INVENTION

Therefore, an object of the present invention is to provide a superimpose-plate for a view finder in which the number of different kinds of inclination angles of the micro-prisms is reduced, so that the manufacturing process of the micro-prisms is simplified.

According to the present invention, there is provided a superimpose-plate for a view finder. The superimpose-plate is put on a focusing glass, on which a subject image obtained through the photographing optical system is formed. The superimpose-plate and the focusing glass are provided in an incident opening of a hollow pentagonal mirror. Further, the superimpose-plate comprises a plurality of micro-prisms.

The plurality of micro-prisms are formed on the superimpose-plate. Each of the micro-prisms shows a triangle in a cross-section. The vertical angle of the triangle is identical in each of the micro-prisms. A ridgeline of each of the micro-prisms is parallel to the right-left direction of the picture plane of the view finder.

Further, another object of-the present invention is to provide a superimpose-plate for a view finder, in which the micro-prisms are gathered as closely together as possible.

According to the present invention, there is provided a superimpose-plate for a view finder. The superimpose-plate is put on a focusing glass, on which a subject image obtained through the photographing optical system is formed. The superimpose-plate and the focusing glass are provided in an incident opening of a hollow pentagonal mirror. The superimpose-plate comprises a micro-prism group.

The micro-prism group is composed of a plurality of micro-prisms formed on a surface of the superimpose-plate. The micro-prism group has a first prism row, composed of a plurality of first micro-prisms which are arranged adjacent to each other, and in a horizontal direction in a picture plane of the view finder. Further, the micro-prism group has a second prism row, composed of a plurality of second micro-prisms which are located at a position corresponding to a place between two adjacent first micro-prisms. The first prism row and the second prism row are arranged alternately in a vertical direction in the picture plane of the view finder.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
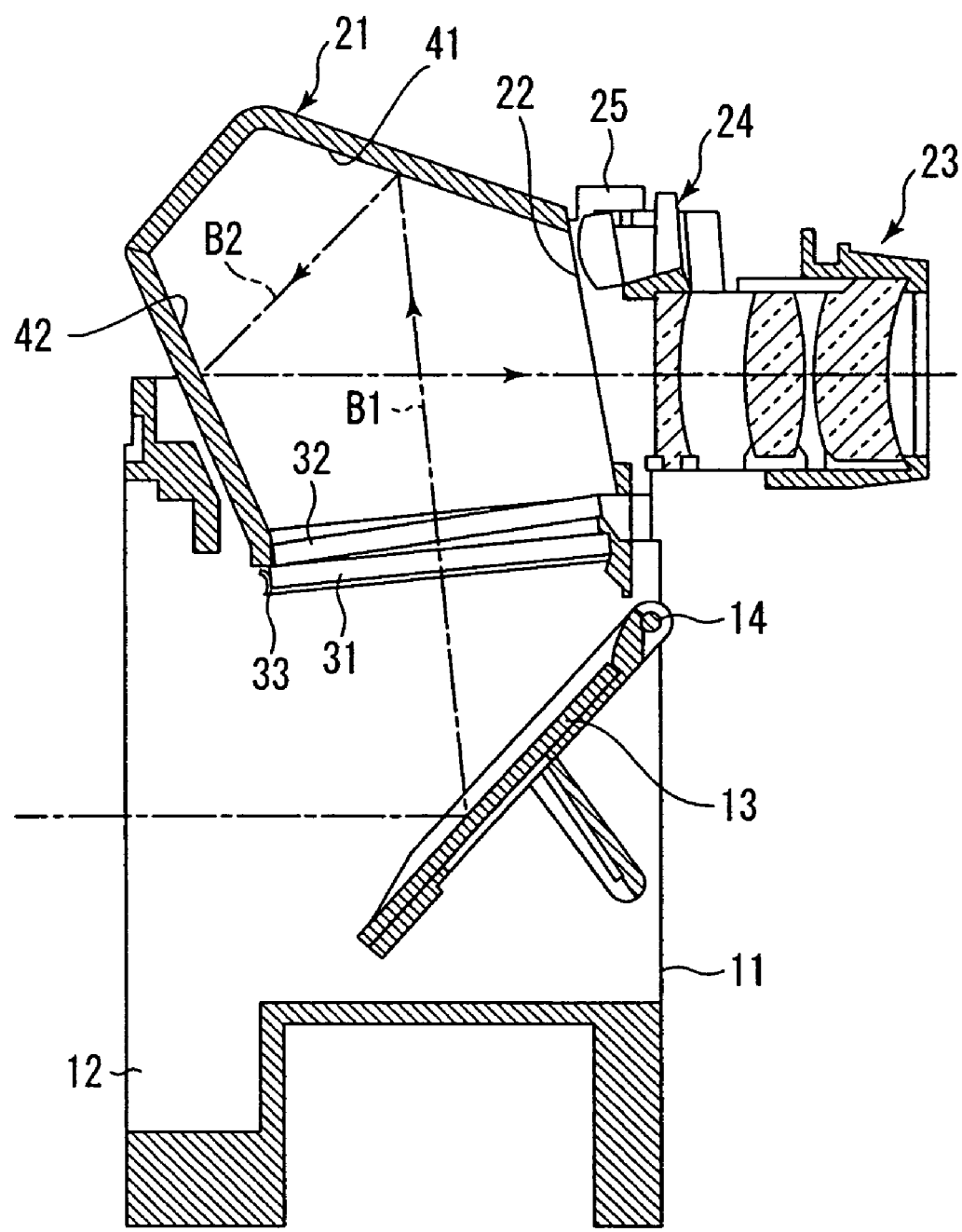
FIG. 1 is a sectional view showing a mirror box and a view finder optical system, to which a first embodiment of the present invention is applied, and in which a light-projecting prism is removed.

The present invention will be described below with reference to the embodiments shown in the drawings.

Figure 2:
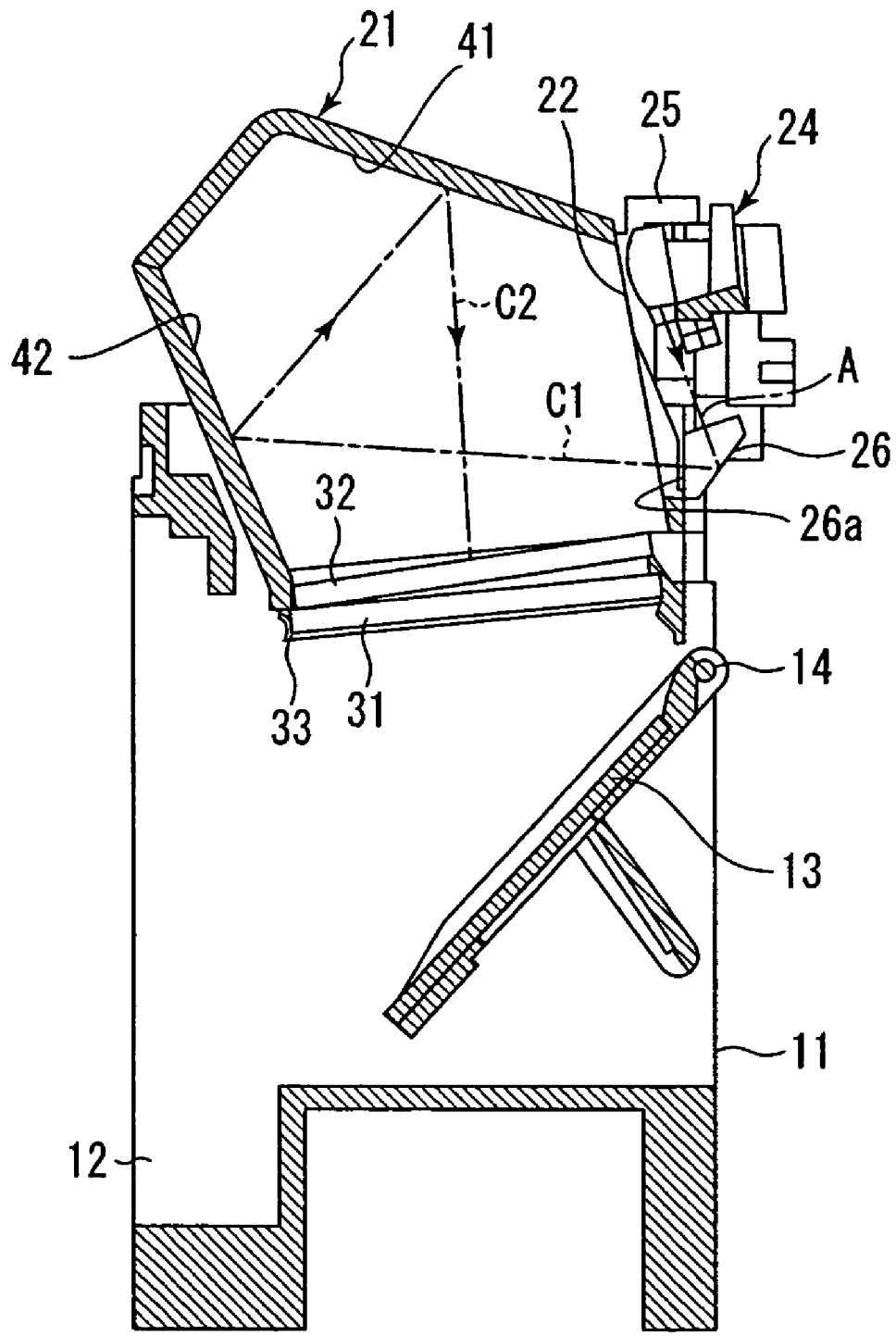
FIG. 2 is a sectional view showing the mirror box and the view finder optical system, in which an ocular optical system is removed.
Figure 3:
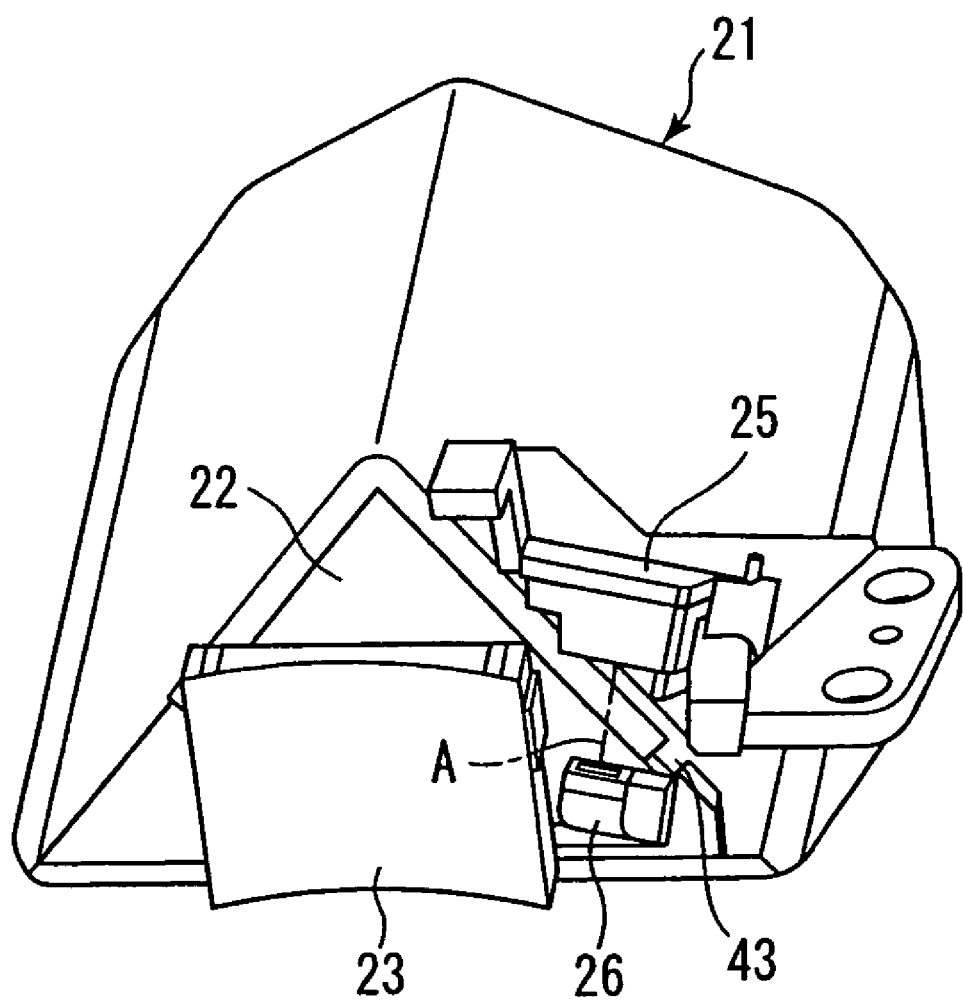
FIG. 3 is a perspective view in which a hollow pentagonal mirror is viewed from the rear side.

FIG. 1 and FIG. 2 are sectional views showing a mirror box and a view finder optical system of a single-lens reflex camera, FIG. 1 indicating a state in which a light-projecting prism is removed, FIG. 2 indicating a state in which an ocular optical system is removed. FIG. 3 is a perspective view in which a hollow pentagonal mirror is viewed from the rear side or a side of the ocular optical system.

A mirror box 11 has an opening 12 at the front portion thereof (i.e., left side in FIGS. 1 and 2), through which light, passing through a photographing optical system (not shown), is made incident. A hollow pentagonal mirror 21 is provided above the mirror box 11. A quick return mirror 13 is housed in the mirror box 11, to reflect light entering through the opening 12 to the hollow pentagonal mirror 21. The quick return mirror 13 is rotatably supported by a pin 14 provided above the rear portion of the mirror-box 11.

A focusing glass 31, on which a subject image obtained through the photographing optical system is formed, and a superimpose-plate (i.e., SI-plate) 32, on which micro-prisms are formed, are provided in an incident opening formed at a lower-portion-of the hollow pentagonal mirror 21, which is disposed in the upper end portion of the mirror box 11. The SI-plate 32 is put on the focusing glass 31. A focusing mark, indicated in a picture plane of the view finder, is formed on the SI-plate 32. The focusing glass 31 and the SI-plate 32 are inclined by a few degrees (e.g., about 5 degrees) in such a manner that the front edges, close to the photographing optical system, of the focusing glass 31 and the SI-plate 32, are lowered. On the other hand, the ocular optical system 23 faces an emergent opening 22 of the hollow pentagonal opening 21. The emergent opening 22 is roughly triangular, and a photometry optical system 24 is provided at a portion close to an upper end of the emergent opening 22. Note that the photometry optical system 24 is omitted in FIG. 3.

The hollow pentagonal mirror-21 has a roof reflecting plane 41, formed at an upper portion, and a third reflecting plane 42, formed at a front portion. A light beam B1, passing through the photographing optical system and reflected on the quick return mirror 13, passes through the focusing plate 31 and the SI-plate 32, is reflected on the roof reflecting plane 41, and reaches the third reflecting plane 42. The light beam B2 reflected on the third reflecting plane 42 passes through the emergent opening 22, and enters the ocular optical system 23.

A light source 25 and a light-projecting prism 26, which form a light-projecting optical system, are provided outside the emergent opening 22. The light source 25 is disposed beside the photometry optical system 24, and close to an upper end of the emergent opening 22. The light-projecting prism 26 is disposed below the light source 25 and beside the ocular optical system 23, and directly fixed on an attaching portion 43 integrally formed on a frame-of the hollow pentagonal mirror 21. The optical axis A extending between the light source 25 and the light-projecting prism 26 is approximately parallel to the plane of the emergent opening 22, and does not interfere with the optical path of the photometry optical system 24.

A light-projecting plane 26a, or an emergent plane of the light-projecting prism 26, faces a corner of a lower portion of the emergent opening 22, and is positioned below the optical axis of the ocular optical system 23. An illumination light beam C1, output from the light source 25 to the light-projecting prism 26, is reflected on the light-projecting prism 26, and is projected from the light-projecting plane 26a toward the emergent opening 22. The illumination light beam C1 is directed-slightly upward with respect to the horizontal plane, and is led to approximately the center portion of the third reflecting plane 42 through the emergent opening 22. The illumination light beam C2 reflected on the third reflecting plane 42 is reflected on the roof reflecting plane 41, and is approximately perpendicularly radiated onto the SI-plate 32.

Figure 4:
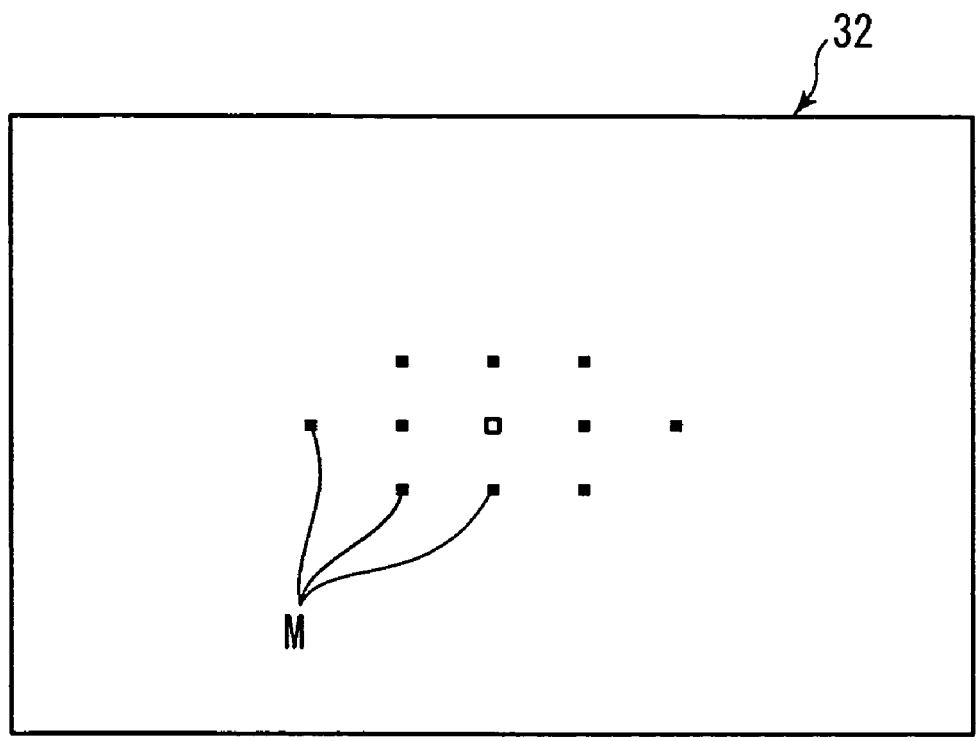
FIG. 4 is a view showing an arrangement of focusing marks formed on a superimpose-plate or SI-plate.

FIG. 4 indicates an arrangement of the focusing marks M formed on the SI-plate 32. In the embodiment, when viewing the ocular optical system 23, the photographer can observe eleven focusing marks M superposed on the subject image, in a picture plane of the view finder. The photographing optical system can focus at points corresponding to the eleven focusing marks M, with respect to the subject. When an in-focus state is obtained in a photographing operation, a focusing mark M corresponding to the in-focus point lights in red, for example. Namely, when it is sensed by an in-focus sensor that any point on the subject is in-focus, a focusing mark M corresponding to the in-focus point is illuminated by the illumination light beam C2 projected from the light source 25.

Figure 5:
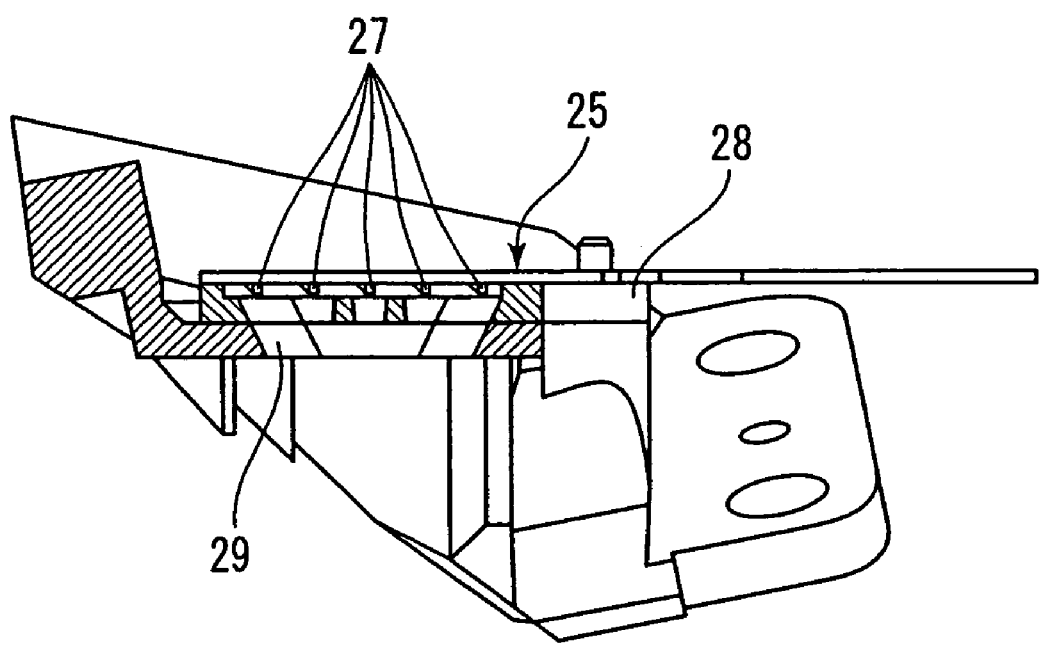
FIG. 5 is a sectional view showing a light source.

The light source 25 is provided with eleven radiating units or light emitting diodes (LEDs) 27 corresponding to the focusing marks M. Each of the LEDs 27 corresponds to one focusing mark M. Namely, illumination-light beams output from the LEDs 27 are radiated on different portions of the SI-plate 32. As shown in FIG. 5, a tapered hole 29 is formed in a frame 28 of the light source 25, so that illumination light beams output from the LEDs 27 are led to the light-projecting prism 26.

Figure 6:
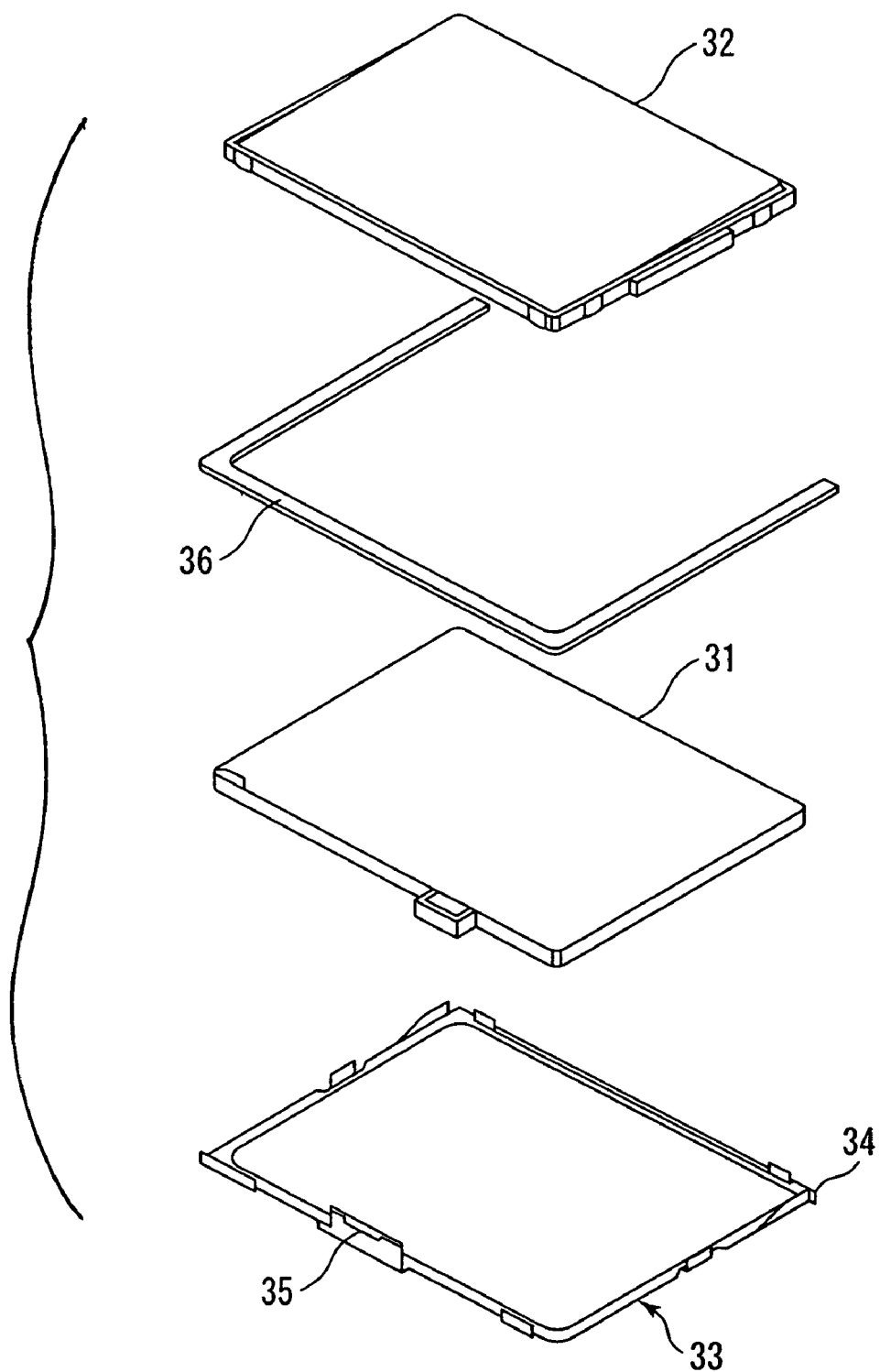
FIG. 6 is a perspective view showing a disassembled focusing glass and SI-plate.

FIG. 6 shows the focusing glass 31 and the SI-plate 32, which are disassembled. A focusing glass frame 33, which is a rectangular frame, is pivotally supported by an upper end of the mirror box 11 at the rear end 34 (see FIG. 1), and has an engaging portion 35 at a front-edge, which can be engaged with a predetermined portion-of the mirror box 11. The focusing glass 31 is fit in-the focusing glass frame 33. The SI-plate 32 is placed on the focusing glass 31 with a channel-shaped focus-adjusting washer 36 intervening therebetween. Namely, space of a predetermined size is formed between the focusing-glass 31 and the SI-plate 32 by the channel-shaped focus-adjusting washer 36. The focusing glass 31, the channel-shaped focus-adjusting washer 36, and the SI-plate 32 are superposed on each other, and are supported by the focusing glass frame 33 and fixed to an upper portion of the mirror box 11.

Figure 7:
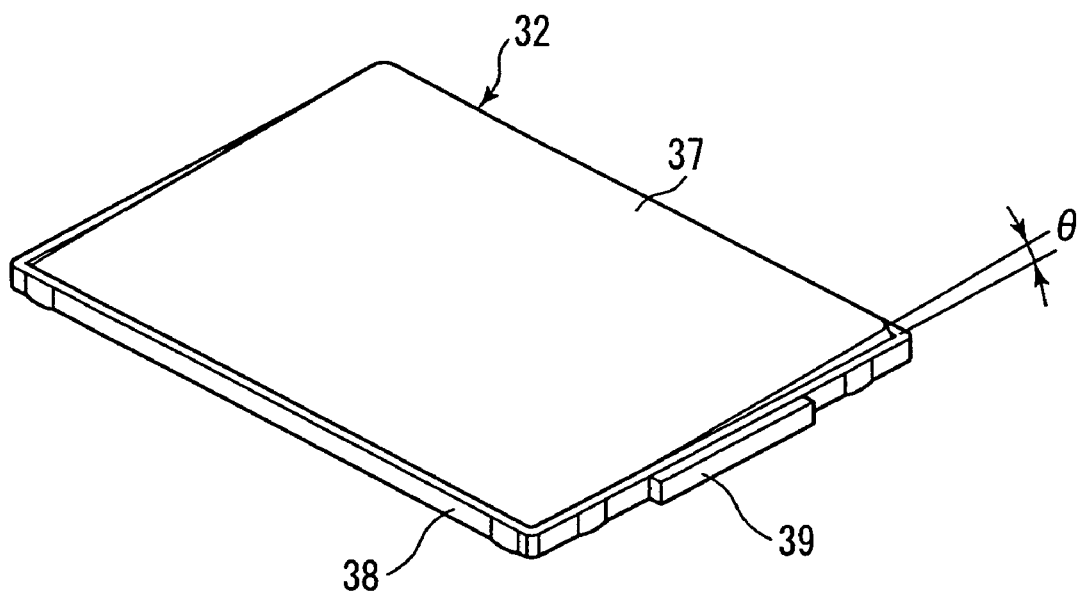
FIG. 7 is an enlarged perspective view of the SI-plate.

FIG. 7 is an enlarged perspective view showing the SI-plate 32. The SI-plate 32 is a transparent member formed of a plastic material. The SI-plate 32 has a plane-parallel plate 37 and an outer frame 38 enclosing the plane-parallel plate 37. The outer frame 38 is mounted on the focus-adjusting washer 36. A rib 39 is formed on an outer surface of a short side of the outer frame 38. The plane-parallel plate 37 is inclined by an angle (1–3 degrees, for example) relative to the outer frame 38. Namely, the plane-parallel plate 37 is inclined so that an edge, close to the photographing optical system (i.e., the left side in FIGS. 1 and 2), of the SI-plate is lowered:relative to the focusing glass 31. In other words, the SI-plate 32 is more inclined than the focusing glass 31.

Figure 8:
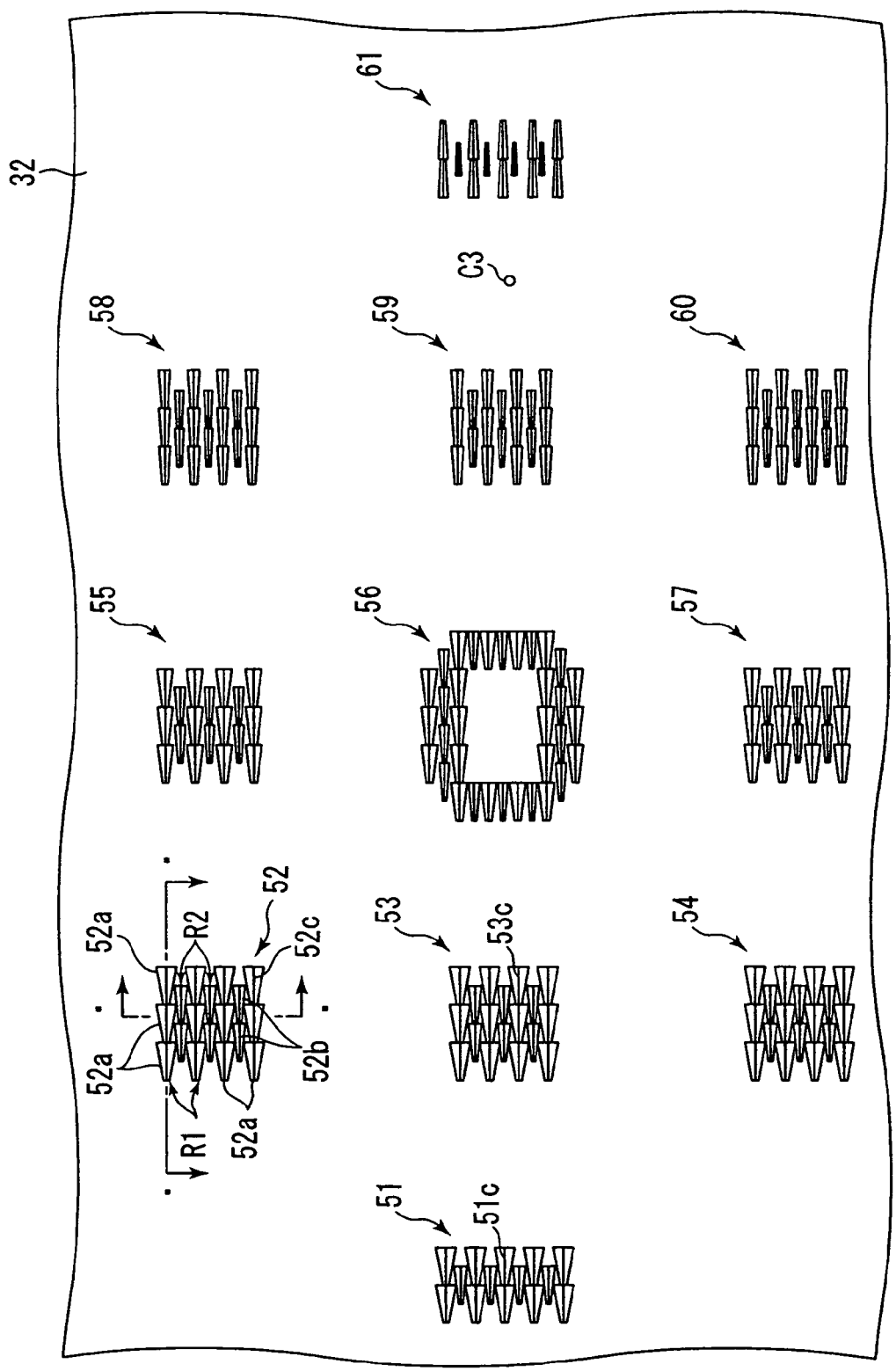
FIG. 8 is an enlarged plane view showing a central portion of the SI-plate.

FIG. 8 shows an enlarged view of the central portion of the SI-plate 32, when viewed from the upper side of the SI-plate 32 and when facing the SI-plate 32 from the side of the photographing optical system, and is also an enlarged view of the central portion of FIG. 4. Namely, the left side of FIG. 8 corresponds to the left side of the picture plane of the view finder.

Lots of micro-prisms 52a, 52b are formed to project from the lower surface of the SI-plate 32. An outline of a micro-prism is a slender trapezoid, when viewing the SI-plate 32 from an upper or lower side. The micro-prism shows a triangle in a cross-section, as described later, and a ridgeline of each of the micro-prisms 51c, 52c, and 53c is parallel to the right-left (or horizontal) direction of the picture plane of the view finder. In other words, the longitudinal direction of each of the micro-prisms is coincident with the horizontal direction in the picture plane of the view finder. The micro-prisms form eleven groups, and each of the micro-prism groups 51–61 corresponds to the focusing mark M (see FIG. 4) indicated in the picture plane of the view finder. Namely, each of the focusing marks M is formed by an aggregation of a plurality of micro-prisms.

In a picture plane of the view finder, the first micro-prism group 51 is located at the leftmost side. The second, third, and fourth micro-prism groups 52, 53, and 54 are positioned at the right side of the first micro-prism group 51. The fifth, sixth, and seventh micro-prism groups 55, 56, and 57 are located at the center of all the micro-prism groups. The eighth, ninth, and tenth micro-prism groups 58, 59, and 60 are positioned at the right side of the fifth, sixth, and seventh micro-prism groups 55, 56, and 57, and the eleventh micro-prism group 61 is at the rightmost side.

Taking the second micro-prism group 52 as a typical example, the structures of the micro-prism groups 51 through 61 are described below. The second micro-prism group 52 is composed of a plurality of micro-prisms, and has relatively large first micro-prisms 52a and relatively small second micro-prisms 52b.

The first micro-prisms 52a are aligned horizontally in FIG. 8 in groups of three, to form four first prism rows R1. In a first prism row R1, the micro-prisms 52a, which are adjacent, are in contact with each other. Namely, an upper side of the trapezoid of a micro-prism 52a, positioned at the center of a row, is in contact with a lower side of the trapezoid of the-micro-prism 52a, disposed at the left side of the center micro-prism 52a. A lower side of the trapezoid of the center micro-prism 52a is in contact with an upper side of the trapezoid of the other micro-prism 52a, disposed at the right side of the center micro-prism 52a.

There are four first prism rows R1. In the space formed between the first prism rows R1, a second prism row R2 composed of a second micro-prisms 52b is provided. The second micro-prism rows R2 are constructed by arranging the second micro-prisms 52b horizontally in FIG. 8, in pairs. A lower side of the trapezoid of the left micro-prism 52b is in contact with an upper side of the trapezoid of the right micro-prism 52b.

The second micro-prism 52b is located at a position corresponding to a place between the two first micro-prisms 52a, adjacent to the first prism row R1. An oblique side of the trapezoid of the second micro-prism 52b is in contact with an end point of the lower side of the trapezoid of the first micro-prism 52a. Similarly, an end point of the lower side of the trapezoid of the second micro-prism 52b is in contact with an oblique side of the trapezoid of the first micro-prism 52a. Thus, the micro-prisms 52a and 52b are arranged in a zigzag manner.

Figure 9:
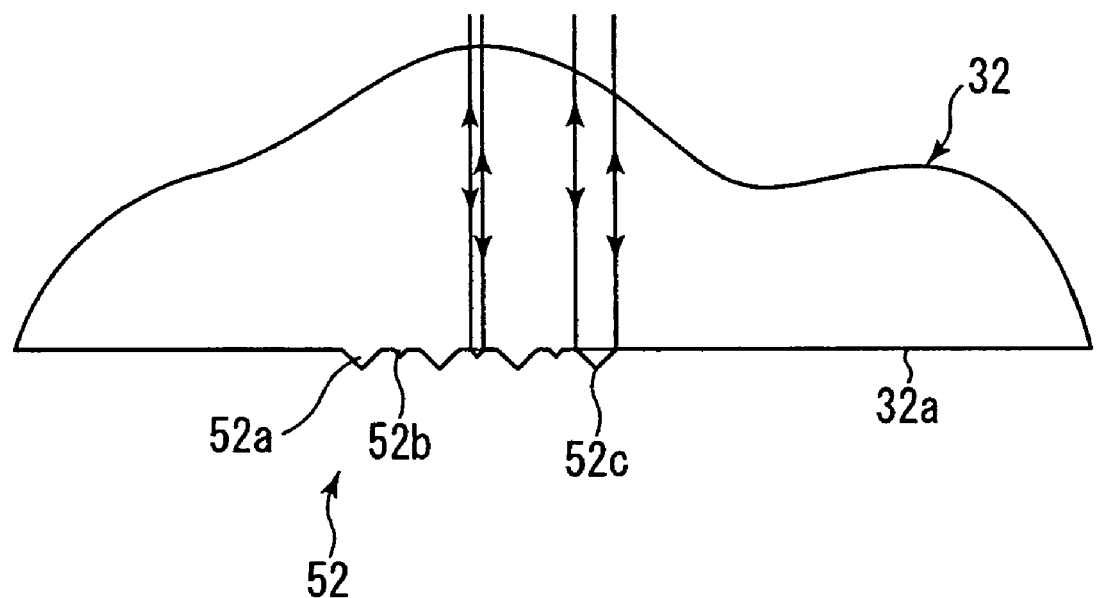
FIG. 9 is a cross-sectional view along a line IX—IX of FIG. 8.
Figure 10:
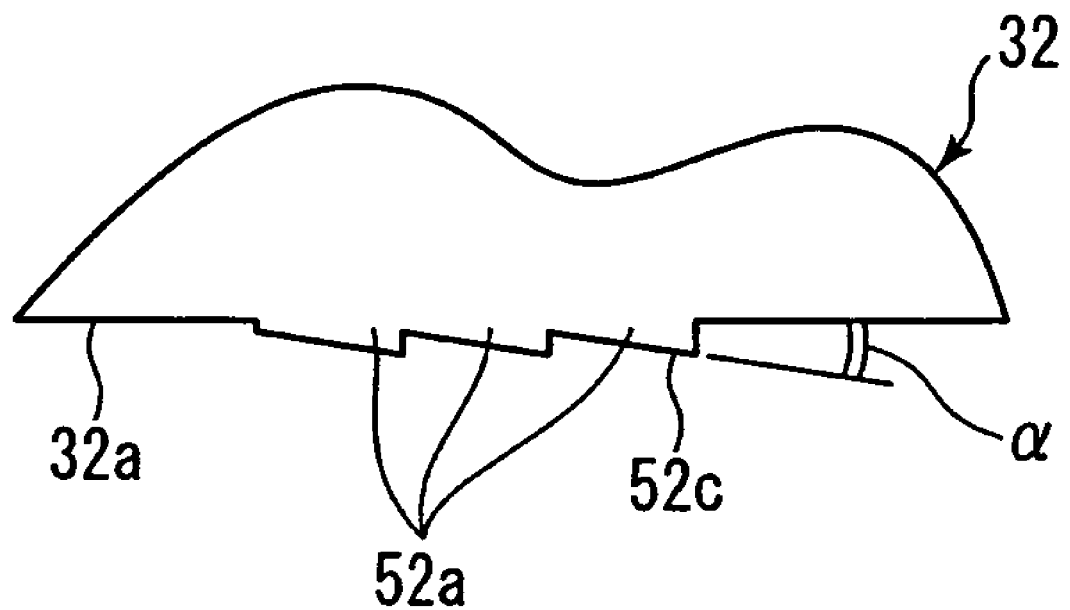
FIG. 10 is a longitudinal sectional view along a line X—X of FIG. 8.

FIGS. 9 and 10 show the second micro-prism group 52. FIG. 9 is a cross-sectional view along line IX—IX of FIG. 8, and FIG. 10 is a longitudinal sectional view along line X—X of FIG. 8. The cross-section shape of each of the first and second micro-prisms 52a and 52b is approximately an isosceles triangle, so that an incident light beam radiated from the above-reflects on the micro-prisms 52a and 52b, and returns in parallel to the incident light beam. Note that the vertical angle of the triangle of each of the micro-prisms 52a and 52b is approximately 90 degrees.

The ridgeline 52c of the reflecting plane of the first micro-prism 52a is at a slant relative to the lower surface 32a of the SI-plate 32, as understood from FIG. 10. The slant angle α is determined in-such manner that an illumination light beam C2 (see FIG. 2), radiated from the roof reflecting plane 41 of the hollow pentagonal mirror 21, is effectively received by the micro-prism 52a. The illumination light beam C2 is radiated from a point above the light source corresponding point C3; shown in FIG. 8, to the SI-plate 32. Therefore, the angle of inclination of an illumination light beam become greater, as it separates from the light source corresponding point C3.

Thus, regarding the inclination angle α of the ridgeline of each of the-micro-prism groups, the first-micro-prism group 51 is the largest. The inclination angles α of the second, third, and fourth micro-prism groups 52, 53, and 54 are equal to each other, and are smaller than that of the first micro-prism group 51. The inclination angles α of the fifth, sixth, and seventh micro-prism groups 55, 56, and 57 are equal to each other, and are smaller than those of the second, third, and fourth micro-prism groups 52, 53, and 54. The inclination angles α of the eighth, ninth, and tenth micro-prism groups 58, 59, and 60 are equal to each other, and are smaller than those of the fifth, sixth, and seventh micro-prism groups 55, 56, and 57.

The eleventh micro-prism group 61 is located at the opposite side of the ninth micro-prism 59 with respect to the light source corresponding point C3. Accordingly, the inclination angle α of the eleventh micro-prism group 61 is opposite to that of the eighth, ninth, and tenth micro-prism groups 58, 59, and 60, but is approximately the sane amount as that for the eighth, ninth, and tenth micro-prism groups 58, 59, and 60.

As described above, the number of different inclination angles α of the ridgelines of the first through eleventh micro-prism groups 51 through 61, is five. The inclination angles α differ in accordance with the horizontal positions in a picture plane of the view finder, and the inclination angles α of the ridgelines of the micro-prism groups aligned in a vertical direction in the picture plane (for example, the micro-prism groups 52, 53, and 54) are the same.

Thus, on a lower surface 32a of the SI-plate 32, the micro-prism groups 51 through 61 are formed at the positions where illumination light beams output from the light source 25 are radiated, and correspond to the focusing marks M. In a photographing operation, when the photographing optical system focuses on any point on the subject, the LED 27 (FIG. 5) corresponding to the point is lit. Due to the illumination light beam C2 (FIG. 2) output from the LED 27, the corresponding micro-prism or the focusing mark M shines in red, the photographer can recognize the focused point.

Note that, in FIG. 8, each of the second through fifth micro-prism groups 51 through 55, and the seventh through tenth micro-prism groups 57 through 60 are square shaped. The sixth micro-prism group 56 is a frame shaped. Further, the first and eleventh micro-prism groups 51 and 61 are rectangular shaped. These shapes can be changed in accordance with necessity or object.

A metal mold for forming a plastic material is used for manufacturing the SI-plate 32 having lots of micro-prisms. Namely, a tip of an edged tool is pressed on the metal mold to form the surface, by which the micro-prisms are formed. The tip of the edged tool has a triangle section, and the surface of the tip is mirror-polished. For example, a portion corresponding to the second micro-prism 52 is formed by pressing an edged tool, which has a tip having the same shape as that of the first micro-prism 52a, on a metal mold. Namely, the corresponding-portion of the first micro-prism 52a is pressed by the edged tool to a predetermined depth, and the corresponding portion of the first micro-prism 52b is pressed by the edged tool to a shallower depth than the first micro-prism 52a.

As described above, there are five different kinds of inclination angle α of the micro-prisms. Therefore, five kinds of edged tools are sufficient for forming the micro-prisms. For example, regarding the second, third, and fourth micro-prisms 52, 53, and 54, since the inclination angle α is common, the same edged tool is used.

Figure 11:
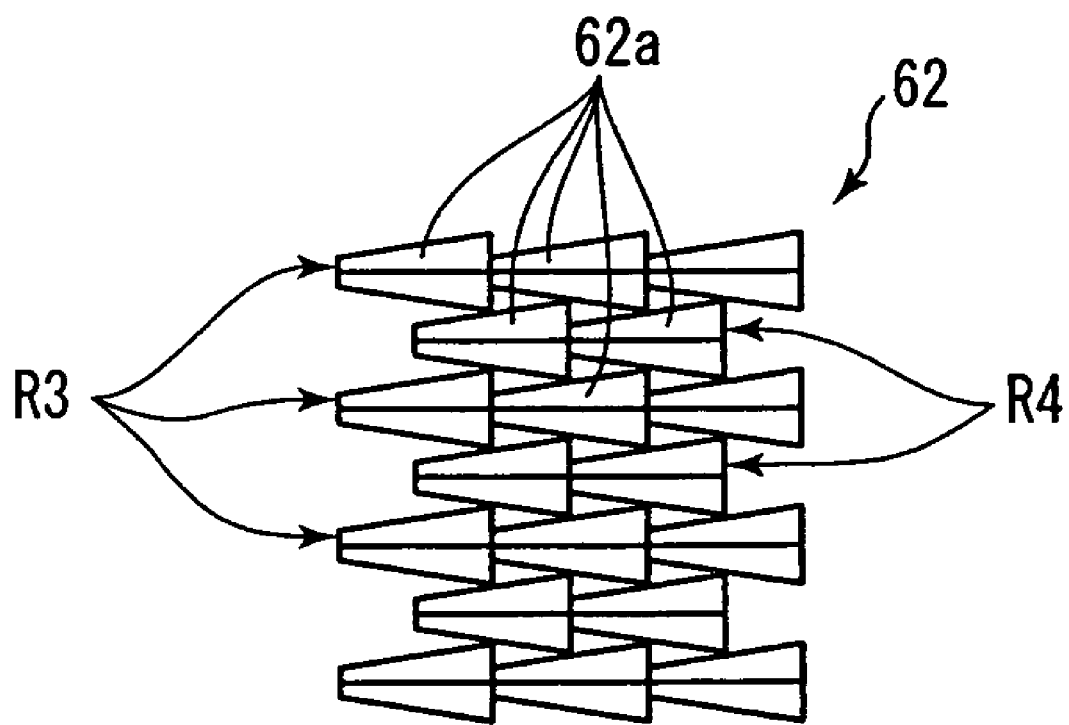
FIG. 11 is a plane view showing another example of a micro-prism group.

FIG. 11 shows another example of the micro-prism group. As understood from a comparison with the second micro-prism group 52 shown in FIG. 8, in the micro-prism group 62, all of the micro-prisms 62a have the same shape and size. Namely, the three micro-prisms 62a forming the first prism row R3 have the same shape and size as the two micro-prisms 62a forming a second prism row R4. The second prism rows R4 are provided between two first micro-prism rows R3 adjacent to each other, and each of the micro-prisms 62a of the second micro-prism row R4 is located at a position corresponding to a place between two adjacent micro-prisms 62a of a first prism row R3. Namely, the micro-prisms 62a are arranged in a zigzag manner. The other constructions are the same as those for the second micro-prism group 52 of FIG. 8.

In the embodiment described above, the light source 25 is provided at an upper portion of the emergent opening 22 of the hollow pentagonal mirror 21, and the light-projecting prism 26 is provided at a lower portion of the emergent opening 22, so that the illumination light beam radiated from the light source 25 is reflected on the light-projecting prism 26, and is projected into the hollow pentagonal mirror 21 through the emergent opening 22. Therefore, in a photographing operation, when an in-focus sensor senses that any point on the subject is in-focus, and the LED 27 corresponding to the focusing point is turned ON, the illumination light beam is reflected on the third reflecting plane 42 and the roof reflecting plane 41, and is led to the SI-plate 32, so that the corresponding micro-prism group is illuminated.

In the embodiment, the number of different kinds of inclination angles α of the micro-prisms is five, and therefore, it is not necessary to change the inclination angle for each of the micro-prism groups. Accordingly, the manufacturing process of the SI-plate 32 is simplified, so that controlling the manufacturing process becomes simple, and the manufacturing cost is suppressed.

Further, in the embodiment, the micro-prism group has first prism rows R1 and R3, each of which is composed of three first micro-prisms which are arranged adjacent to each other and in a horizontal direction in a picture plane of the view finder, and second-prism rows R2 and R4, each of which is composed of two second micro-prisms which are located at a position corresponding to a place between two adjacent first micro-prisms. The first-prism rows R1 and R3 and the second prism rows R2 and R4 are arranged alternately in a vertical direction in the picture plane of the view finder. Thus, the first micro-prism and the second micro-prism are arranged in a zigzag manner. Accordingly, in the micro-prism group, the micro-prisms are gathered closely together, so that the micro-prism group is recognized as a single point by the photographer.

Although the embodiments of the present invention have been described herein with reference to the accompanying drawings, obviously many modifications and changes may be made by those skilled in this art without departing from the scope of the invention.

The present disclosure relates to subject matters contained in Japanese Patent Applications No. 2003-009594 (filed on Jan. 17, 2003) and No. 2003-009663 (filed on Jan. 17, 2003), which are expressly incorporated herein, by reference, in their entirety.

The invention claimed is:

1. A superimpose-plate for a view finder, said superimpose-plate being on a focusing glass, on which a subject image obtained through the photographing optical system is formed, said superimpose-plate and said focusing glass being provided in an incident opening of a hollow pentagonal mirror, said superimpose-plate comprising:
   a plurality of micro-prisms on said superimpose-plate;
   each of said micro-prisms appearing as a triangle in a cross-section, the vertical angle of said triangle being identical in each of said micro-prisms, a ridgeline of each of said micro-prisms being parallel to the right-left direction of a picture plane of said view finder,
   wherein an outline of at least one of said micro-prisms is a slender trapezoid when viewing said superimpose-plate from an upper side.

2. A superimpose-plate according to claim 1, wherein said plurality of micro-prisms form at least one micro-prism group, each said micro-prism group corresponding to a mark to be indicated in said picture plane of said view finder.

3. A superimpose-plate according to claim 2, wherein said micro-prism group comprises a relatively large first micro-prism and a relatively small second micro-prism.

4. A superimpose-plate according to claim 2, wherein said micro-prism group comprises micro-prisms having the same shape and size.

5. A superimpose-plate according to claim 1, wherein said micro-prisms project from a lower surface of said superimpose-plate.

6. A superimpose-plate for a view finder, said superimpose-plate being on a focusing glass, on which a subject image obtained through the photographing optical system is formed, said superimpose-plate and said focusing glass being provided in an incident opening of a hollow pentagonal mirror, said superimpose-plate comprising:
   a plurality of micro-prisms on said superimpose-plate;
   each of said micro-prisms appearing as a triangle in a cross-section, the vertical angle of said triangle being identical in each of said micro-prisms, a ridgeline of each of said micro-prisms being parallel to the right-left direction of a picture plane of said view finder,
   wherein a ridgeline of at least one of said micro-prisms is at a slant relative to a surface of said superimpose-plate.

7. A superimpose-plate according to claim 6, wherein a plurality of micro-prism groups, each of which comprises a plurality of said micro prisms, is provided, the inclination angles of said ridgelines of said plurality of micro-prism groups differing in accordance with a horizontal position of each said micro-prism group in a picture plane of said view finder.

8. A superimpose-plate according to claim 6, wherein a plurality of micro-prism groups, each of which comprises a plurality of said micro prisms, is provided, the inclination angles of said ridgelines of said plurality of micro-prism groups aligned in a vertical direction in said picture plane of said view finder, being the same.

9. A superimpose-plate according to claim 6, wherein said plurality of micro-prisms form at least one micro-prism group, each said micro-prism group corresponding to a mark to be indicated in said picture plane of said view finder.

10. A superimpose-plate according to claim 9, wherein said micro-prism group comprises a relatively large first micro-prism and a relatively small second micro-prism.

11. A superimpose-plate according to claim 9, wherein said micro-prism group comprises micro-prisms having the same shape and size.

12. A superimpose-plate according to claim 6, wherein said micro-prisms project from a lower surface of said superimpose-plate.

13. A superimpose-plate for a view finder, said superimpose-plate being on a focusing glass, on which a subject image obtained through the photographing optical system is formed, said superimpose-plate and said focusing glass being provided in an incident opening of a hollow pentagonal mirror, said superimpose-plate comprising:
   a micro-prism group comprising a plurality of micro-prisms on a surface of said superimpose-plate;
   said micro-prism group having a first prism row, comprising a plurality of first micro-prisms which are arranged adjacent to each other and in a horizontal direction in a picture plane of said view finder, and a second prism row,—comprising a plurality of second micro-prisms which are located at a position between two adjacent first micro-prisms, said first prism row and said second prism row being arranged alternately in a vertical direction in said picture plane of said view finder.

14. A superimpose-plate according to claim 13, wherein said micro-prism group corresponds to a mark to be indicated in said picture plane of said view finder.

15. A superimpose-plate according to claim 13, wherein said first micro-prism is larger than said second micro-prism.

16. A superimpose-plate according to claim 13, wherein said first micro-prism is the same size as said second micro-prism.

17. A superimpose-plate according to claim 13, wherein an outline of said first micro-prism is a slender trapezoid, when viewing said superimpose-plate from an upper side.

18. A superimpose-plate according to claim 17, wherein, in said first prism row, an upper side of the trapezoid of a third micro-prism, positioned at the center of said row, is in contact with a lower side of the trapezoid of a fourth micro-prism, adjacent to said third micro-prism, and a lower side of the trapezoid of said third micro-prism is in contact with an upper side of the trapezoid of a fifth micro-prism, adjacent to said third micro-prism.

19. A superimpose-plate according to claim 13, wherein an outline of said second micro-prism is a slender trapezoid, when viewing said superimpose-plate from an upper side.

20. A superimpose-plate according to claim 19, wherein said second prism row comprises a plurality of said second micro-prisms, and in said second prism row, a lower side of the trapezoid of a third micro-prism, positioned at a left side, is in contact with an upper side of the trapezoid of a fourth micro-prism, positioned at a right side.

21. A superimpose-plate according to claim 13, wherein said micro-prisms project from a lower surface of said superimpose-plate.

\* \* \* \* \*